UNITED STATES PATENT OFFICE.

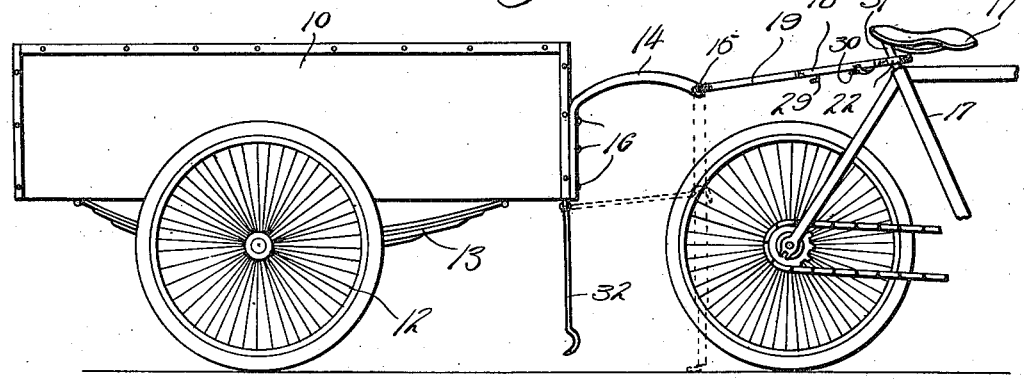
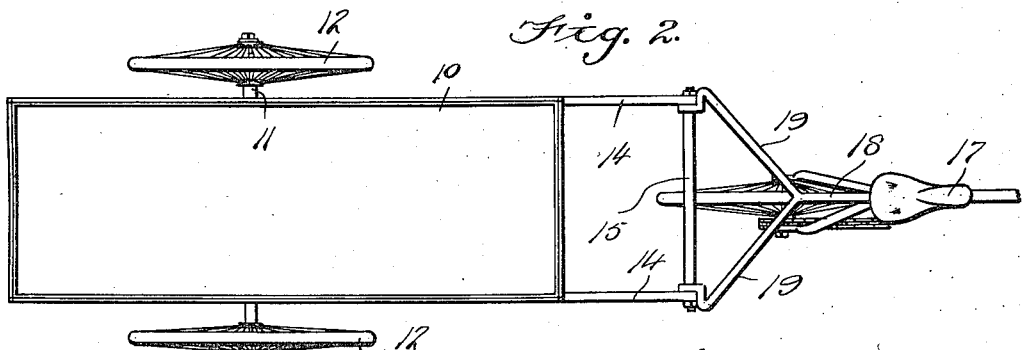
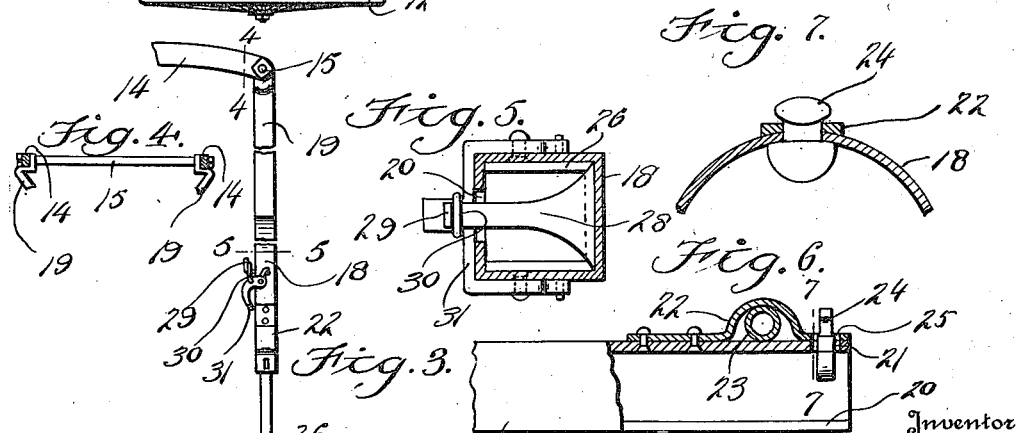

GIUSEPPE CORDARO, OF BROOKLYN, NEW YORK.

CARRIER.

1,251,866.  Specification of Letters Patent.  Patented Jan. 1, 1918.

Application filed January 19, 1917. Serial No. 143,384.

*To all whom it may concern:*

Be it known that I, GIUSEPPE CORDARO, a subject of the King of Italy, residing at Brooklyn, in the county of Kings and State of New York, have invented certain new and useful Improvements in Carriers, of which the following is a specification.

This invention relates to an improved carrier or luggage cart and the principal object of the invention is to provide an improved means for connecting the luggage cart with a bicycle or the like so that the luggage cart may be drawn along the street behind the bicycle, the connection being further so constructed that it will serve as a prop or handle holding the body of the luggage carrier level when not connected with the bicycle.

Another object of the invention is to so construct this connection that it may be easily connected with the bicycle and to further so construct the connection that when connected with the bicycle there will be no danger of its working loose.

This invention is illustrated in the accompanying drawings, wherein:—

Figure 1 is a view in side elevation of the improved carrier shown connected with a bicycle, Fig. 2 is a top plan view of the improved carrier and bicycle, Fig. 3 is a fragmentary view showing the connection set up as a prop for holding the body of the carrier level, Fig. 4 is a fragmentary sectional view taken along the line 4—4 of Fig. 3, Fig. 5 is an enlarged sectional view taken along the line 5—5 of Fig. 3, Fig. 6 is an enlarged fragmentary sectional view of the free end portion of the connecting bar or supporting standard, and, Fig. 7 is a sectional view taken along the line 7—7 of Fig. 6.

The vehicle or carrier is provided with a body 10, axle 11 and supporting wheels 12 and may be provided with springs 13 of the usual vehicle spring type. The handle of this carrier is provided with side bars 14 connected by a cross bar 15 and secured to the vehicle body in any preferred manner, such for instance by rivets or other fasteners 16. The yoke connecting the carrier or vehicle with the bicycle indicated in general by the numeral 17, is provided with a standard 18 having arms 19 mounted upon the cross bar 15 of the vehicle handle. This standard 18 is provided with a longitudinally extending slot 20 and with an opening 21 and carries a resilient clamping strip 22 engaging the saddle post 23 of the bicycle and releasably held in a locking position by the key or fastener 24 which passes through the opening 25 of the clamping strip and through the opening 21 of the standard 18 and is then turned to the position shown in Fig. 7 so that the clamping strip will be releasably but securely held in a locking position. A support or core 26 is slidably mounted within the standard 18 and is provided at its lower end with a ground engaging foot 27 and at its upper end with a tongue 28 bent to extend through the slot 20 of the standard and terminating in a hook 29 which will be engaged by the eye 30 of the latch 31 when the yoke is disconnected from the bicycle and placed in the position shown in Fig. 3. When in this position, the hook 32 will engage the yoke at the lower ends of the arms 19 and the yoke will thus be held in the vertical position to retain the vehicle body in the level position. It will thus be seen that with this connecting yoke, the carrier may be releasably but securely connected with a bicycle and it will be further seen that when so desired, the yoke may be disconnected from the saddle post of the bicycle and the core 26 then drawn outwardly and held in the extended position by the latch 31 thus permitting the carrier or vehicle to be pushed around by hand and retained in the proper position when released. It will be further noted that with this structure, the carrier will be so connected with the saddle post to permit of a certain amount of pivotal movement about the saddle post in order to permit the bicycle to turn with the vehicle following the turning movement such as when going around corners.

What is claimed is:—

1. A vehicle including a body, a handle for said body having side bars, a cross bar connecting said side bars, a standard, arms extending from said standard and pivotally mounted upon the cross bar of the handle, means for connecting the free end of said standard with the frame of a cycle, and means carried by the body of said vehicle for engaging said standard and releasably holding the same in an upright position.

2. A vehicle including a body, a handle for said body, including a cross bar, a standard, arms extending from said standard and pivotally connected with the cross bar of said handle, means for connecting said standard with the frame of a cycle, and a hook connected with the body of said vehicle for engaging said standard and releasably holding the yoke in an upright position.

3. A vehicle including a body, a handle for said body, a standard, arms extending from the standard and pivotally connected with the handle of the vehicle, a core slidably mounted in said standard, means for connecting said standard with the frame of the cycle, means for releasably holding said core extended beyond the free end of said standard, and means for releasably holding the standard in an upright position.

4. A vehicle including a body, a handle for said body, and a yoke pivotally connected with said handle and including a hollow standard provided with a longitudinally extending slot, a core fitting in said standard and provided with a tongue extending through the slot and terminating in a hook, a latch including eye for engaging said hook to releasably hold the core in an extended position, and means on the standard for connecting said standard with the frame of a cycle with the core positioned within the standard.

5. A yoke for the purpose described including a standard having a longitudinally extending slot in one side, a core slidably mounted in the standard, a tongue extending from said core through the slot of the standard, a latch pivotally connected with the standard and provided with an eye for engaging said tongue and releasably holding the core against movement into the standard, and means on the standard for connecting the standard with the frame of a cycle.

6. A yoke of the character described including a standard, an extension having telescoping connection with said standard, means for releasably holding the extension in an extended position, and means on the standard for connecting said standard with the frame of a cycle.

In testimony whereof I affix my signature in presence of two witnesses.

GIUSEPPE CORDARO.

Witnesses:
    D. E. TOWLE,
    M. RIVERA.